US012187068B2

(12) United States Patent
Takahashi et al.

(10) Patent No.: US 12,187,068 B2
(45) Date of Patent: Jan. 7, 2025

(54) FIBER-BUNDLED PART FOR WRITING INSTRUMENTS, AND PEN TIP AND WRITING INSTRUMENT USING THE FIBER-BUNDLED PART

(71) Applicant: MITSUBISHI PENCIL COMPANY, LIMITED, Tokyo (JP)

(72) Inventors: Toshihiro Takahashi, Fujioka (JP); Toshimi Kamitani, Tokyo (JP); Hirotake Izawa, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/248,089

(22) PCT Filed: Oct. 7, 2021

(86) PCT No.: PCT/JP2021/037207
§ 371 (c)(1),
(2) Date: Apr. 6, 2023

(87) PCT Pub. No.: WO2022/075421
PCT Pub. Date: Apr. 14, 2022

(65) Prior Publication Data
US 2023/0406029 A1 Dec. 21, 2023

(30) Foreign Application Priority Data
Oct. 9, 2020 (JP) ................................ 2020-171440

(51) Int. Cl.
*B43K 8/06* (2006.01)
*B43K 1/12* (2006.01)
(Continued)

(52) U.S. Cl.
CPC .................. *B43K 1/12* (2013.01); *B43K 8/06* (2013.01); *B43K 27/02* (2013.01); *B43K 27/04* (2013.01); *B43K 27/08* (2013.01)

(58) Field of Classification Search
CPC . B43K 1/12; B43K 8/06; B43K 27/02; B43K 27/04; B43K 27/08
See application file for complete search history.

(56) References Cited

U.S. PATENT DOCUMENTS 4,270,962 A 6/1981 Sugihara et al.
7,888,275 B2 2/2011 Ward et al.
(Continued)

FOREIGN PATENT DOCUMENTS

EP 1 230 863 A2 8/2002
JP 62-3995 A 1/1987
(Continued)

OTHER PUBLICATIONS

International Search Report issued Nov. 9, 2021 in PCT/JP2021/037207 filed on Oct. 7, 2021 2 pages.
(Continued)

*Primary Examiner* — Jennifer C Chiang
(74) *Attorney, Agent, or Firm* — Oblon, McClelland, Maier & Neustadt, L.L.P.

(57) ABSTRACT

This application is related to a fiber-bundled part for writing instruments having excellent strength and durability, as well as a pen tip and a writing instrument using the fiber-bundled part, which can be suitably used for pen tips, ink feed cores and relay cores of writing instruments such as marking pens and felt-tip pens. The fiber-bundled part for writing instruments of the present disclosure is used for the ink feed core leading to the pen tip or a writing pen core, and comprises a multifilament of long fibers having different melting points, and the multifilament at least contain crimped fibers.

7 Claims, 9 Drawing Sheets

(51) Int. Cl.

| | |
|---|---|
| ***B43K 27/02*** | (2006.01) |
| ***B43K 27/04*** | (2006.01) |
| ***B43K 27/08*** | (2006.01) |

(56) References Cited

U.S. PATENT DOCUMENTS

| | | | | |
|---|---|---|---|---|
| 2006/0163152 | A1 | 7/2006 | Ward et al. | |
| 2024/0051329 | A1* | 2/2024 | Izawa .................... | B43K 1/003 |

FOREIGN PATENT DOCUMENTS

| | | | |
|---|---|---|---|
| JP | 5-98528 | A | 4/1993 |
| JP | 2011-20443 | A | 2/2011 |
| WO | WO 2006/078849 | A2 | 7/2006 |

OTHER PUBLICATIONS

Extended European Search Report issued in European Patent Application No. 21877720.9 on Oct. 8, 2024.

* cited by examiner

[FIG. 1]
(a)
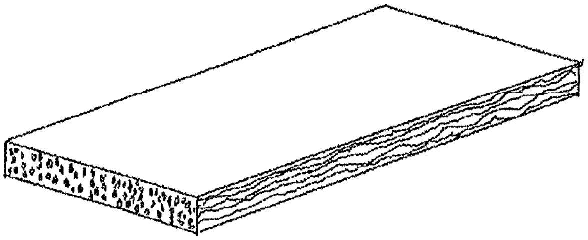
(b)
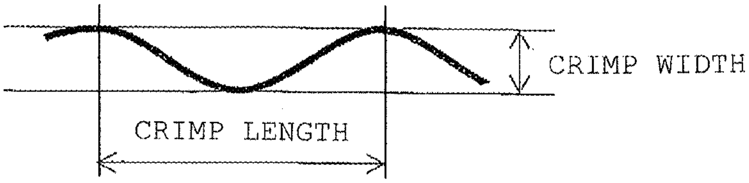
CRIMP RATIO = (CRIMP WIDTH / CRIMP LENGTH) × 100
(c)
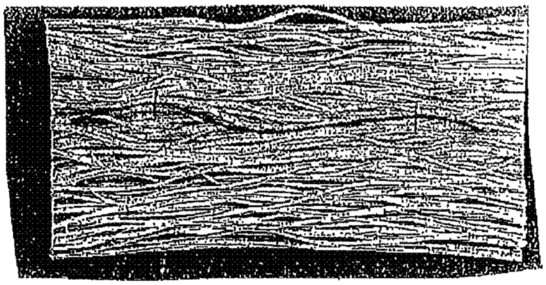
(d)
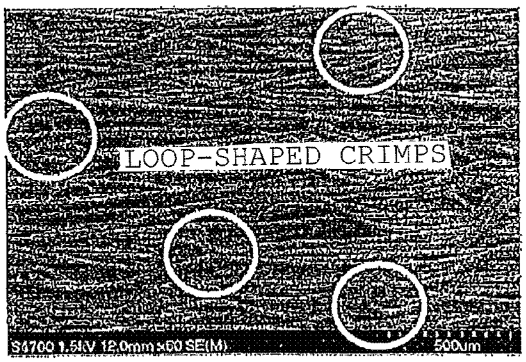

(a) (b)

FIBER-BUNDLED PART FOR WRITING INSTRUMENTS, AND PEN TIP AND WRITING INSTRUMENT USING THE FIBER-BUNDLED PART

TECHNICAL FIELD

The present specification is directed to a fiber bundled part for writing instruments that can be suitably used for pen tips, ink feed cores, relay cores and the like of writing instruments such as marking pens and felt-tip pens, as well as a pen tip and a writing instrument using the fiber bundled part.

BACKGROUND ART

Disclosure of Invention

Conventionally, various types of fiber-bundled parts made of a fiber bundle of synthetic resin fibers or natural fibers have been known and used as pen tips, relay cores and the like in writing instruments and as applying parts for cosmetics in makeup applicators.

The fiber-bundled parts in these writing instruments and makeup applicators are used as their ink feed cores such as pen cores and relay cores, and their liquid supply cores such as applicating parts.

Among these fiber-bundled parts, binderless (with no adhesive thermosetting resin used) fiber-bundled parts are known as those that can easily adjust hardness and porosity to meet a wide range of quality requirements.

The examples of the binderless fiber-bundled parts include liquid supply fiber cores (e.g., see Patent Document 1), formed of a mixture of a large number of fibers which are made up of two or more kinds of fibers including a main fiber and a thermo-fusible fiber having a low-melting-point portion having a melting point lower than that of the main fiber on at least part or whole of the outer surface, and which are aligned and bundled longitudinally and compressed, and characterized in that the fibers are bound via the low-melting-point portion when thermally fused in such a state as to form continuous pores between the fibers and is shaped in a solid-bar form with the fibers aligned longitudinally.

The technology described in Patent Document 1 uses two or more kinds of fibers, one of which is a low-melting-point fiber. However, because of a dimensional stability problem caused by thermal shrinkage of the low-melting-point fiber, it has been difficult to fabricate a fiber-bundled part with only a multifilament made of composite-type long fibers such as a core-sheath type and the like. In order to stably bond the low-melting-point fibers, the fabrication needed to use a mixture of two or more types of short fibers having different melting points (fibers formed to have lengths not the same as, but rather shorter than, that of the pen core, etc. to be formed, for heat welding purposes).

However, in the fiber-bundled part using short fibers, when a pen core, relay core, liquid supply core or the like is formed so as to have a small cross-section, for example, when a fiber bundle core particularly small in diameter such as a rectangular or irregular cross-sectional core is to be formed, it is necessary to reduce the content of short fibers to be bundled. In this case, when a bundle of fibers is pulled out, a tension is applied to the bundle in the longitudinal direction so that there is a risk of the tangled short fibers being loosened from each other to produce a gap. As a result, there have been problems that the fiber density varies along the longitudinal direction of the core, in the worst case, the entanglement between the short fibers weakens so that the bundle of fibers ends up separating in the longitudinal direction.

PRIOR ART DOCUMENTS

Patent Documents

Patent Document 1: Japanese Unexamined Patent Application publication No. 2011-20443 (claims, examples, etc.)

SUMMARY OF THE INVENTION

Problems to be Solved by the Invention

In view of the above-described problems of the prior art, the present disclosure is to solve the problems, aiming at providing a fiber-bundled part for writing instruments, as well as a pen tip and a writing instrument using the same, which is used in a pen core, a relay core, a liquid supply core, or the like, and which, even if it is applied to a fiber bundle core particularly small in diameter such as a core having a rectangular cross-section or an irregular cross-section, can present excellent strength and durability and is free from variation in yarn density with respect to the longitudinal direction of the core without losing ink or liquid supply performance and the like as a fiber-bundled part.

Means for Solving the Problem

In view of the prior art problems and the like, the inventors hereof have attempted to solve the problems, and have found out the way of obtaining a fiber-bundled part for writing instruments as well as a pen tip and a writing instrument using the fiber-bundled part which fulfills the above object by providing a fiber-bundled part for writing instruments used for an ink feed core leading to a pen tip or a writing pen core including a multifilament of long fibers having different melting points, and making the multifilament at least contain fibers having a specific physical property, and thereby have completed the present disclosure.

That is, the fiber-bundled part for writing instruments of the present disclosure is used for an ink feed core leading to a pen tip or a writing pen core, and comprises: a multifilament of long fibers having different melting points, the multifilament at least containing crimped fibers.

It is preferable that a crimp ratio of the crimped fibers that is determined by a following formula (I) falls within a range from 1 to 50%, $$\text{the crimp ratio}=(\text{a crimp width}/\text{a crimp length})\times 100 \quad (1)$$

[In the above formula (I), a distance between a wave crest to a next wave crest in the fiber is defined as the "crimp length", and a distance between the wave crest (peak) and a trough (valley) of a wave in the direction perpendicular to the crimp length is defined as the "crimp width".]

Here, the crimp shape may include loop shapes as shown in FIG. 1(*d*), not limited to wavy shapes.

It is preferable that a content ratio of the crimped fibers to a total amount of the fiber-bundled part for writing instruments ranges from 10 to 100% by mass.

These fiber-bundled parts for writing instruments preferably have a rectangular cross-section.

The pen tip of the present disclosure is a pen tip having a writing pen core, characterized in that the writing pen core is formed of the fiber-bundled part for the writing instruments having the above configuration. Further, a pen tip having the ink feed core that feeds ink to a writing part is characterized in that the ink feed core is formed of the fiber-bundled part for the writing instruments having the above configuration.

The writing instrument of the present disclosure is characterized by inclusion of the pen tip with the writing pen core of the above configuration, and/or the pen tip with the ink feed core for feeding ink to the writing part, of the above configuration.

In the present disclosure, the "crimped fibers" refers to the fibers that are obtained by imparting two-dimensional or three-dimensional crimps and distortions, fixing the distortions by an appropriate method so as to disturb the parallelism between the fibers, thereby giving bulkiness and stretchability to the fibers. In the present disclosure, preferred crimped fibers should have a crimp ratio determined by the above formula (I) falls within the above range.

Advantages of the Invention

The present disclosure can offer a fiber-bundled part for writing instrument, as well as a pen tip and a writing instrument using the same, which, even if it is applied to a fiber bundle core particularly small in diameter such as a core having a rectangular cross-section or an irregular cross-section, can present excellent strength and durability and is free from variation in yarn density with respect to the longitudinal direction of the core without losing ink or liquid supply performance and the like as a fiber-bundled part.

The objects and advantages of the present disclosure may be realized and obtained by the configurations particularly specified in the claims and their combinations. Further, both the foregoing general description and the following detailed description are given for exemplary and explanatory purposes, and should not limit the present disclosure recited in the scope of claims.

BRIEF DESCRIPTION OF DRAWINGS

FIG. 1 (*a*) A schematic perspective view showing one embodied example of a fiber-bundled part for writing instruments of the present disclosure; (*b*) an illustrative view for explaining the crimp ratio of crimped fibers in the fiber-bundled part for writing instruments of the present disclosure; (*c*) an electron microscope (SEM) photograph showing one example of having crimped fibers in the fiber-bundled part for writing instruments; and (*d*) an electron microscope (SEM) photograph showing one example where the crimped shapes in the crimped fibers in the fiber-bundled part for writing instruments of the present disclosure include loop shapes in addition to wavy shapes.

MODE FOR CARRYING OUT THE INVENTION

Hereinafter, embodiments of the present disclosure will be described in detail with reference to the drawings. However, it should be noted that the technical scope of the present disclosure is not limited to each of the embodiments detailed below, and extends to the inventions described in the claims and equivalents thereof.

The fiber-bundled part for writing instruments of the present disclosure is composed of long fiber multifilaments having fibers with different melting points (in the present disclosure, even when the fibers do not have a melting point but have a softening point, this shall be deemed as a melting point), and the multifilaments contain at least crimped fibers. FIG. 1 (*a*) is a schematic perspective view showing an embodied example of a fiber-bundled part for writing instruments having a rectangular cross-section.

Fibers generally include filaments (monofilaments, multifilaments) and sliver. Monofilaments and multifilaments are used to obtain a fiber-bundled part having uniform density in the longitudinal direction. The fiber-bundled part for writing instruments in the present disclosure is formed of multifilament fibers of long types having different melting points, and part of the multifilament fibers of long types contains crimped fibers.

In the present disclosure, the multifilaments having different melting points include those composed of a combination of two or more polymers having different chemical structures, such as a combination of polymers having different melting points, selected from polyester, acrylic, polypropylene, wholly aromatic polyester, wholly aromatic polyesteramide, polyamide, semi-aromatic polyamide, wholly aromatic polyamide, wholly aromatic polyether, wholly aromatic polycarbonate, polyimide, polyamideimide (PAI), polyether ether ketone (PEEK), polyphenylene sulfide (PPS), poly-p-phenylenebenzobisoxazole (PBG), polybenzimidazole (PBI), polytetrafluoroethylene (PTFE), ethylene-vinyl alcohol copolymer, etc. Further, a combination of polymers which have a common chemical structure at least in part but different melting points from one another by introduction of a copolymer involving another structural unit; for example, a combination of polyethylene terephthalate and a copolymerized polyethylene terephthalate copolymer having a lower melting point than the former, and the like can be preferably mentioned.

Figure 2:
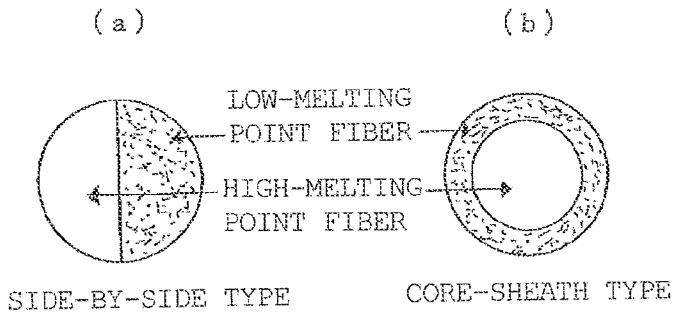
FIG. 2 (*a*) and (*b*) show schematic diagrams showing, in cross-section, multi filaments, each formed of fibers having different melting points, and used for the fiber-bundled parts for writing instruments of the present disclosure, (*a*) being a side-by-side type and (*b*) being a sheath-core type.

For example, as shown in FIGS. 2(*a*) and 2(*b*), it is possible to use either a core-sheath type, or a side-by-side type, formed of a low-melting-point fiber and a high-melting-point fiber. As a core-sheath type multifilament a single yarn is composed of a core component and a sheath component. As a side-by-side type multifilament a single yarn is a side-by-side type composite of two or more types of polymers. Among these, the core-sheath type multifilament is preferable, and it is more preferable that the sheath component in the core-sheath type has a melting point lower than that of the core component.

In the present disclosure, the melting point difference (high melting point temperature–low melting point temperature) may and should be at least 30° C., preferably 50° C. or more. The melting point difference of 30° C. or more makes it possible to thermally fuse only the sheath of the core-sheath type multifilaments so as to form point-bonding at the entangled points between the fibers whose mutual parallelism is disturbed by crimping, thereby create three-dimensional reticulate structures and solidify the fibers together. The upper limit of the melting point difference is not particularly limited as long as the fibers are heat-fusible composite fibers available on the market and can be crimped. But the realistic temperature is 100° C. In the present disclosure, the melting point is the value measured conforming to JIS K 7121:2012.

In the present disclosure, the multifilament of long fibers having fibers with different melting points contains at least crimped fibers. The crimped fibers to be used are obtained by imparting two-dimensional or three-dimensional crimps and distortions to the multifilament of long fibers with different melting points, fixing the distortions by an appropriate method so as to disturb the parallelism between the fibers, thereby giving bulkiness and stretchability to the fibers.

In terms of achievement of bonding and solidifying by point-bonding the fibers at the entangled points between the fibers to create three-dimensional reticulate structures, and in terms of formation of a fiber bundle core of high porosity by entanglement between highly bulky fibers, the crimped fibers used in the present disclosure preferably have a crimp ratio of 1 to 50%, more preferably 1 to 20%, as defined in the following formula (1) and shown in FIG. 1(*b*).

$$\text{Crimp Ratio}=(\text{Crimp Width}/\text{Crimp Length})\times 100 \qquad (\text{I})$$

[In the above formula (I), the distance between a wave crest to a next wave crest in the fiber is defined as the "crimp length", and the distance between the crest (peak) and the trough (valley) of the wave in the direction perpendicular to the crimp length is defined as the "crimp width".]

In the crimped fibers in the fiber-bundled part for writing instruments of the present disclosure, the crimp shape is not limited to a wavy form. As shown in FIG. 1(*d*), when the crimped fibers have loop shapes, the crimp ratio can be calculated by defining the distance from the crest of the loop to the trough (valley) of the fiber as the "crimp width", similarly to the wavy fiber.

Specifying the crimp ratio to be 1% or more makes it possible to bond and solidify the fibers by point-bonding the fibers at the entangled points between the fibers to create three-dimensional reticulate structures, and form a fiber bundle core of a high porosity by entanglement between highly bulky fibers. On the other hand, by specifying it equal to or lower than 50%, it is possible to create an optimal flow path for ink delivery without losing the parallelism between the fibers.

From the above points, the content ratio of the crimped fibers is preferably 10 to 100% by mass relative to the total amount of the fiber-bundled part for writing instruments.

The fineness of the multifilament of long fibers with different melting points and that of the crimped fibers are preferably 1 to 20 deniers from the viewpoint of ink retention and tactile sensation when used as a pen tip.

Figure 4:
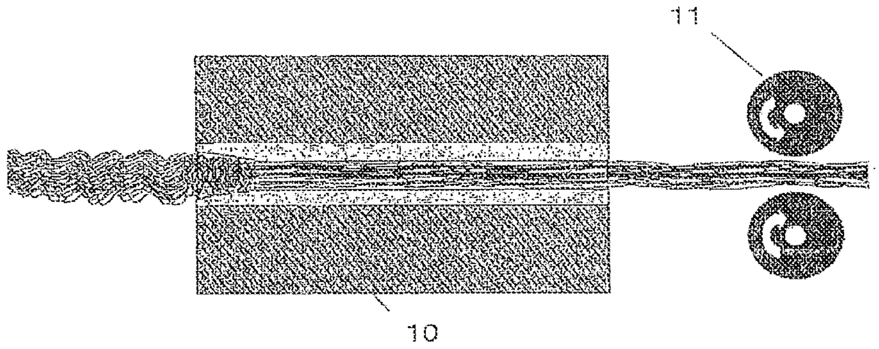
FIG. 4 A schematic diagram showing, in cross-section, one embodied example of a manufacturing process for manufacturing a fiber-bundled part for writing instruments of the present disclosure.

The fiber-bundled part for writing instruments of the present disclosure is produced in such a manner that the multifilaments of long fibers with different melting points and the above-described crimped fibers are put together at the aforementioned specific ratio, stretched and aligned as a bundle, then the bundle of fibers is heated and pressed to be solid without using any short fibers or a solvent as a binder resin for bonding the fibers, namely as a fiber bundled part of bound and solidified fibers. For example, as shown in FIG. 4, the multifilaments of long fibers with different melting points and the above-described crimped fibers are put together at the aforementioned specific ratio in a thermoforming machine 10 while being pulled and aligned longitudinally by tension rollers 11 arranged ahead, whereby the fibers are bundled and heated, pressed and solidified without use of a binder resin or a solvent, thus forming a fiber-bundled part having a specific shape such as a sheet-like part having a rectangular cross-section, a cylindrical part, a polygonal column, star-shaped polygonal column, and the like.

It is important that the way of heating at this production is implemented within a range in which complete fusion of the fibers does not occur. Further, the heating temperature and time aiming at this thermal molding may vary depending on the type of fibers and the size of the fiber-bundled part to be produced, but may and should be specified within ranges in which the fibers can be bound and solidified by heat and pressure so as to produce a fiber bundle having a binding strength superior to the pull-out resistance from the die. That is, the fibers are bound and solidified into a fiber bundle by heating at a temperature that is equal to or higher than the melting point of the lower-melting point fiber of the two types of fibers having different melting points and equal to or higher than the heat shrinkage completion temperature for crimping. For example, when a PET-based fiber having a heat shrinkage completion temperature of 150° C. is used as the thermoplastic resin crimping fiber, the fibers can be bound and solidified by heating at a temperature that is 150° C. or higher and is equal to or higher than the melting point of the lower-melting point fiber and is lower than the melting point of the higher-melting point fiber.

In addition, as to the strength of the fiber-bundled part, it is possible to control the degree of fusion bonding of the low-melting-point fiber by adjusting the fiber loaded amount (basis weight volume), heating temperature and heating time.

The shape, dimensions, etc. of the fiber-bundled part for writing instruments obtained by the above method can be specified in accordance with its utility such as for sliver, for a pen core, for an ink feed core, for a relay core and the like, so as to have an arbitrary shape (rectangular in cross-section, sheet-like shape, cylindrical shape, polygonal column, star-shaped polygonal column), arbitrary dimensions, arbitrary thickness and the like.

Depending on the utility for the fiber-bundled part such as for a pen core, for an ink feed core, for a relay core and like, the fiber-bundled part obtained by the above method may be cut to an arbitrary length and then shaped and processed for each purpose, as required, to provide a desired fiber-bundled part for writing instruments.

Figure 3:
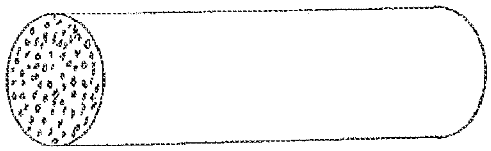
FIG. 3 A schematic perspective view showing another embodied example of a fiber-bundled part for writing instruments of the present disclosure.

FIG. 1(*a*) shows an embodied example of a sheet-like fiber-bundled part for writing instruments having a rectangular cross-section obtained above, and FIG. 3 is a schematic perspective view of a cylindrical fiber-bundled part for writing instruments.

In the obtained fiber-bundled part for writing instruments, it is preferable that the fiber bundle has a substantially uniform density. Making the fiber bundle have the substantially uniform density can be achieved by forming the fiber bundle having a yarn density of 2,000 to 7,000 d/$mm^2$.

Further, in this manufacturing method, satisfactory fiber-bundled parts can be manufactured by having a fiber density of 2,000 d/mm 2 or more and specifying the thickness to be 0.1 to 10 mm for those having a rectangular cross-section; and by having a fiber density of 2,000 d/mm 2 or more and specifying the outside diameter to be 0.1 mm or more for those having a circular cross-section.

In addition, the porosity, hardness, etc. of the fiber-bundled part for writing instruments vary depending on the type of ink, the type of writing instrument and the like. For example, the porosity can be adjusted to 30 to 80% by controlling the fiber bundle density, the forming temperature, heating time and the like during the above manufacturing. In the present disclosure, "porosity" is calculated as follows. First, the fiber-bundled part for writing instruments having a known mass and apparent volume is dipped in water, and saturated with water, and then the mass is measured in a state of being taken out from the water. From the measured mass, the volume of water soaked up in the writing core is derived. Assuming the volume of water as the pore volume of the fiber-bundled part for writing instrument, the porosity can be calculated from the following formula:—

Porosity (unit: %)=(water volume)/(apparent volume of the fiber-bundled part for writing instruments)×100.

The thus configured fiber-bundled part for writing instruments according to the present disclosure can offer a fiber-bundled part which, even if it is applied to a fiber bundle core particularly small in diameter such as a core having a rectangular cross-section or an irregular cross-section, can be manufactured simply and effectively at low cost so as not to vary in yarn density in the longitudinal direction of the core, still be excellent in strength and durability without impairing the ink or other liquid supply performance as a fiber-bundled part, and is suitable for writing instruments and applicators for cosmetics and others.

Next, the pen tip and writing instrument of the present disclosure will be explained.

The pen tip of the present disclosure is characterized by: 1) a pen tip having a writing pen core which is composed of the fiber-bundled part for writing instruments having the above configuration; and 2) a pen tip having an ink feed core for feeding ink to the writing part of the pen tip, in which the ink feed core is composed of the above fiber-bundled part for writing instruments.

The writing instrument of the present disclosure is characterized by including a pen tip having the writing pen core configured as described above and/or a pen tip having an ink feed core for feeding ink to the writing part configured as above.

Figure 6:
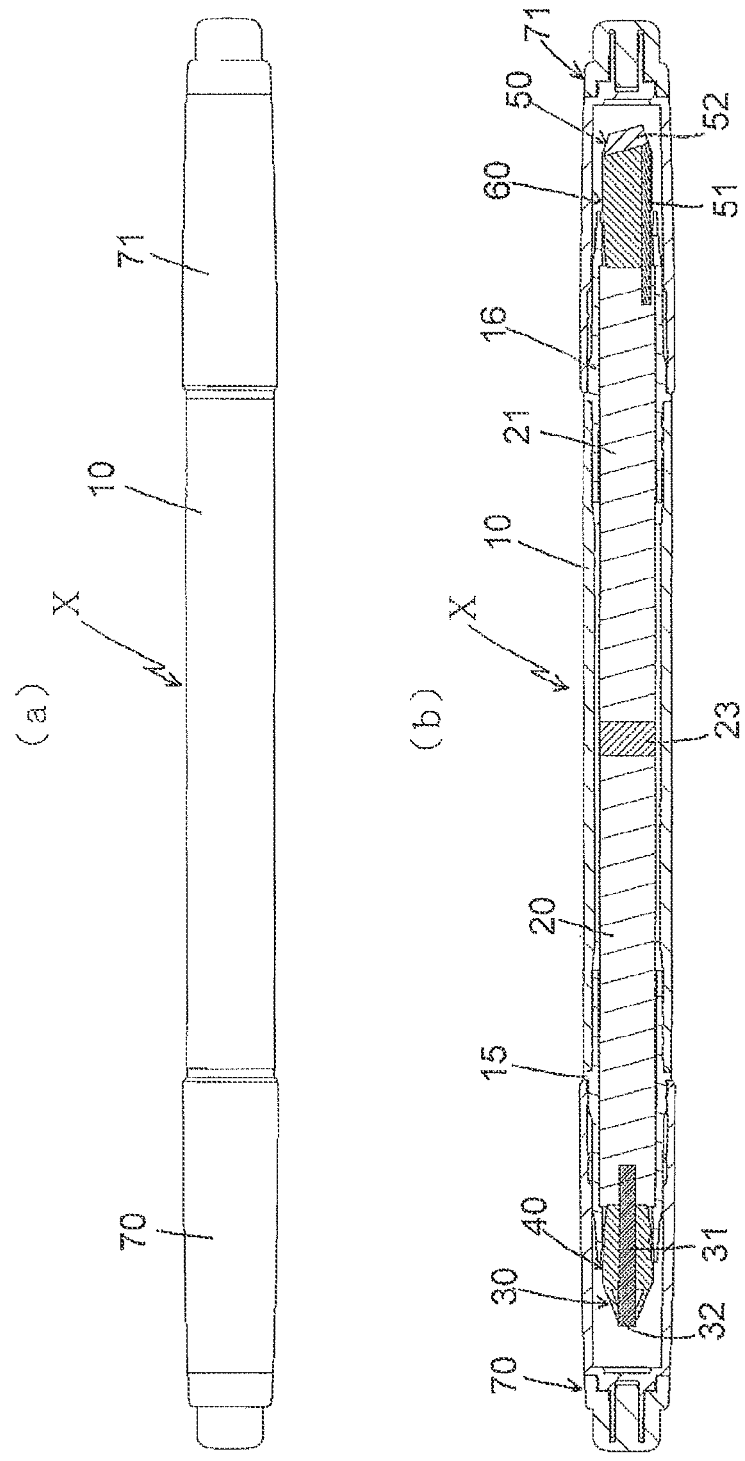
FIG. 6 An example of a writing instrument of the present disclosure, showing an embodiment of a twin-type writing instrument having pen tips at both ends, (*a*) being a front view and (*b*) being a longitudinal section viewed from the front.
Figure 7:
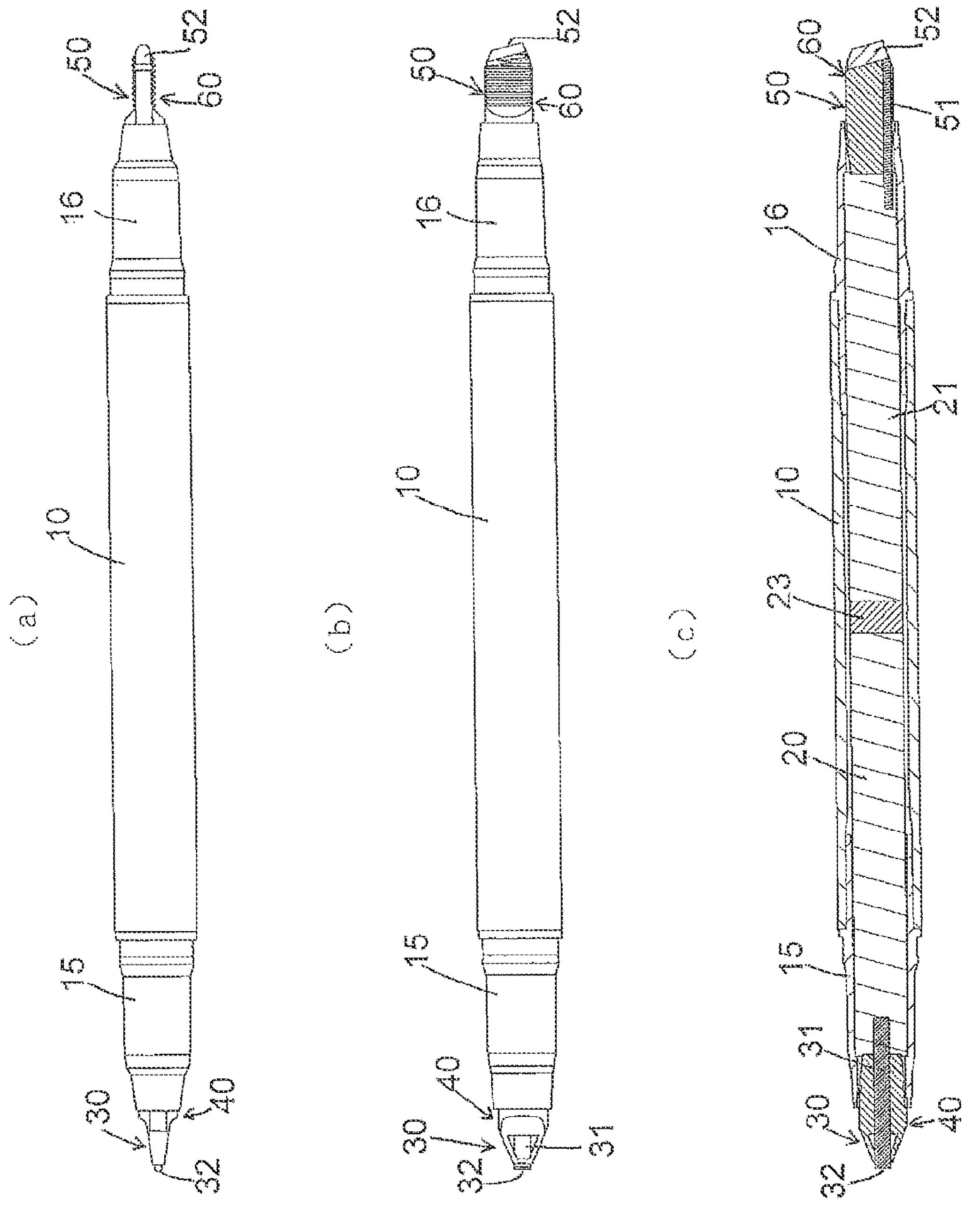
FIG. 7 Drawings showing the writing instrument shown in FIG. 6 with its caps at both ends removed, (*a*) a plan view, (*b*) a front view and (*c*) a longitudinal section viewed from the front.
Figure 8:
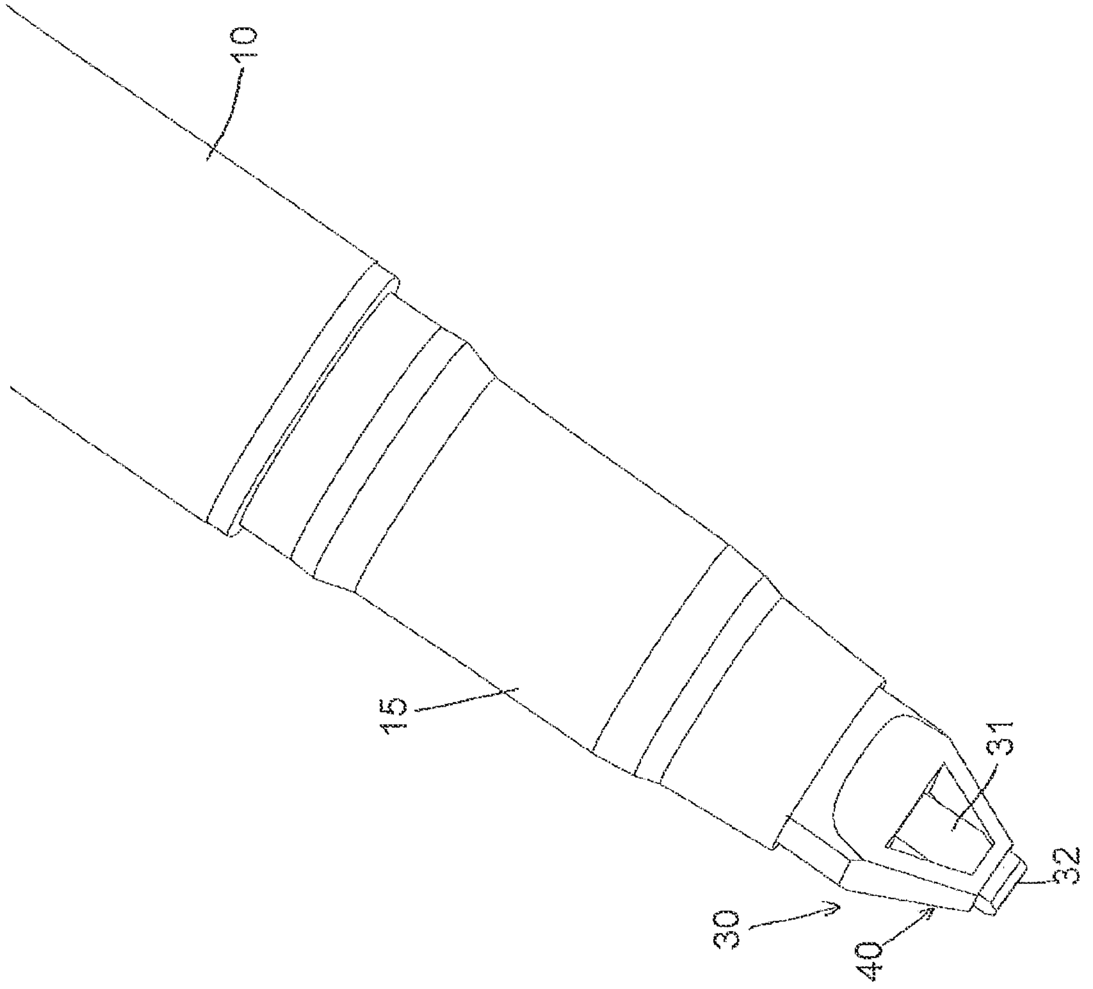
FIG. 8 An enlarged perspective view in which a half of the twin-type writing instrument of FIG. 6, including a pen tip at one end having a writing pen core, is enlarged.
Figure 9:
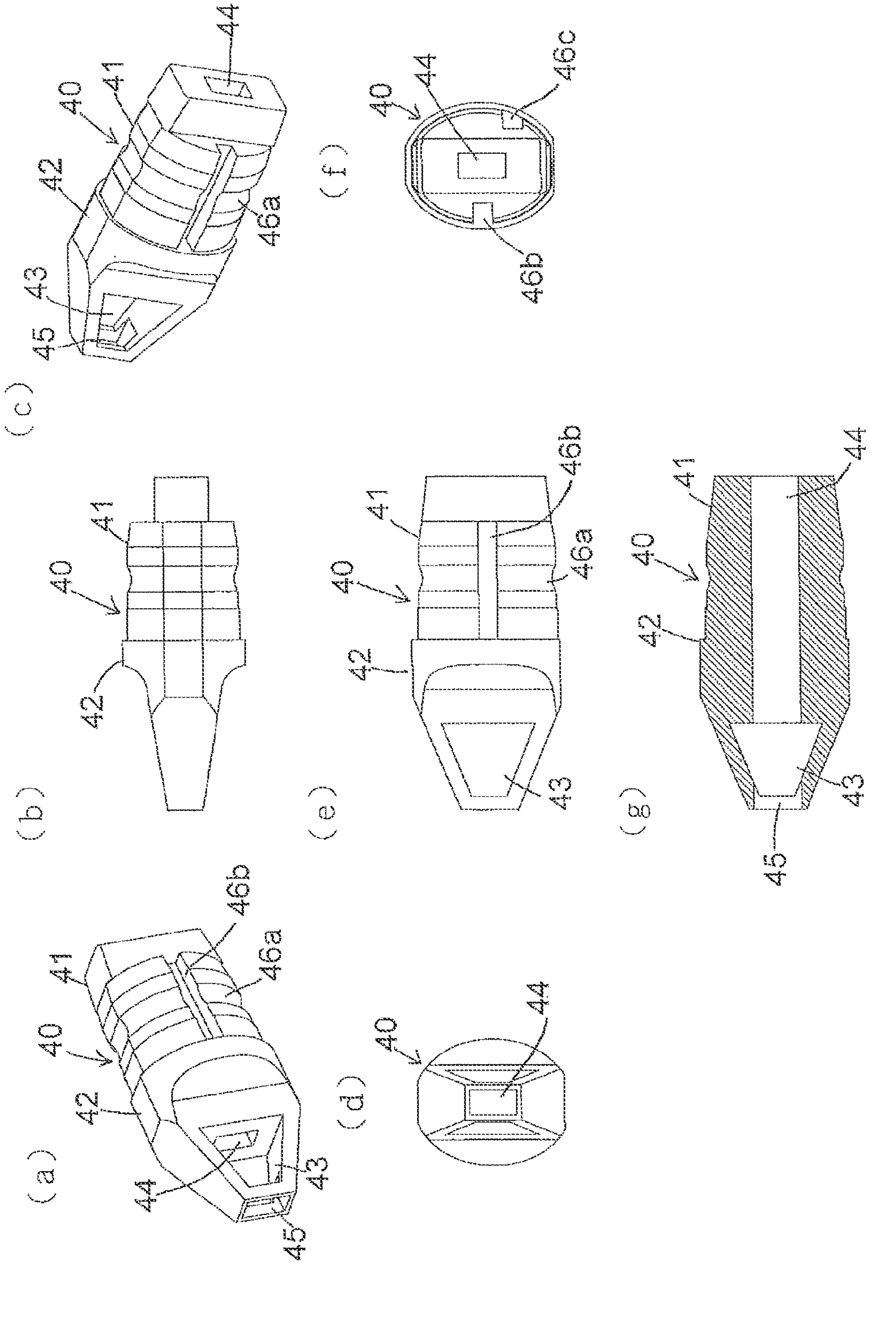
FIG. 9 Drawings showing one embodiment of a holder for holding the writing pen core of the pen tip of FIG. 8, (*a*) a perspective view seen from the front side, (*b*) a plan view, (*c*) a perspective view seen from the rear side, (*d*) a right side view, (*e*) a front view, (*f*) a left side view, and (*g*) a longitudinal section viewed from the front.
Figure 10:
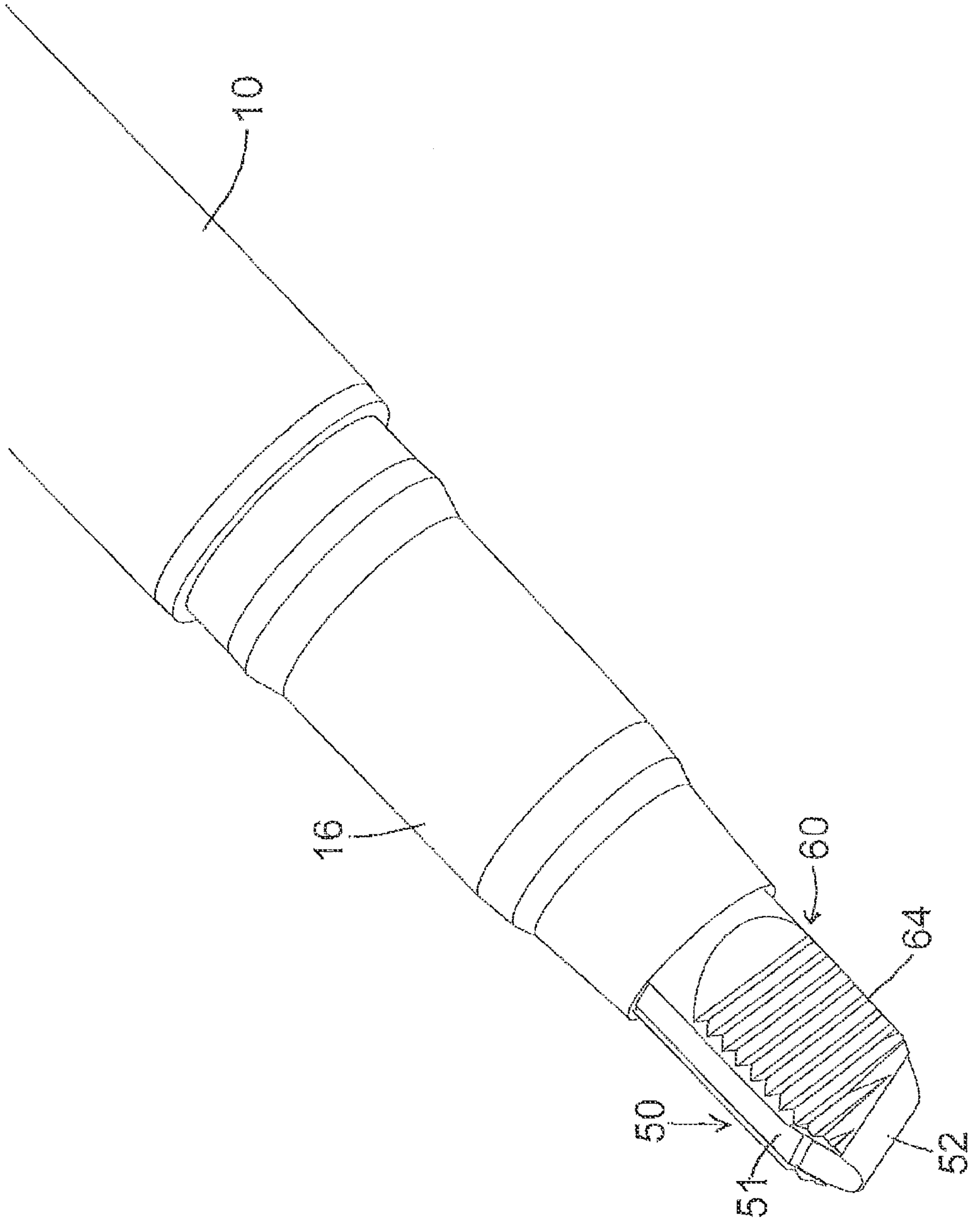
FIG. 10 An enlarged perspective view in which a half of the twin-type writing instrument of FIG. 6, including a pen tip at the other end having an ink feed core, is enlarged.
Figure 11:
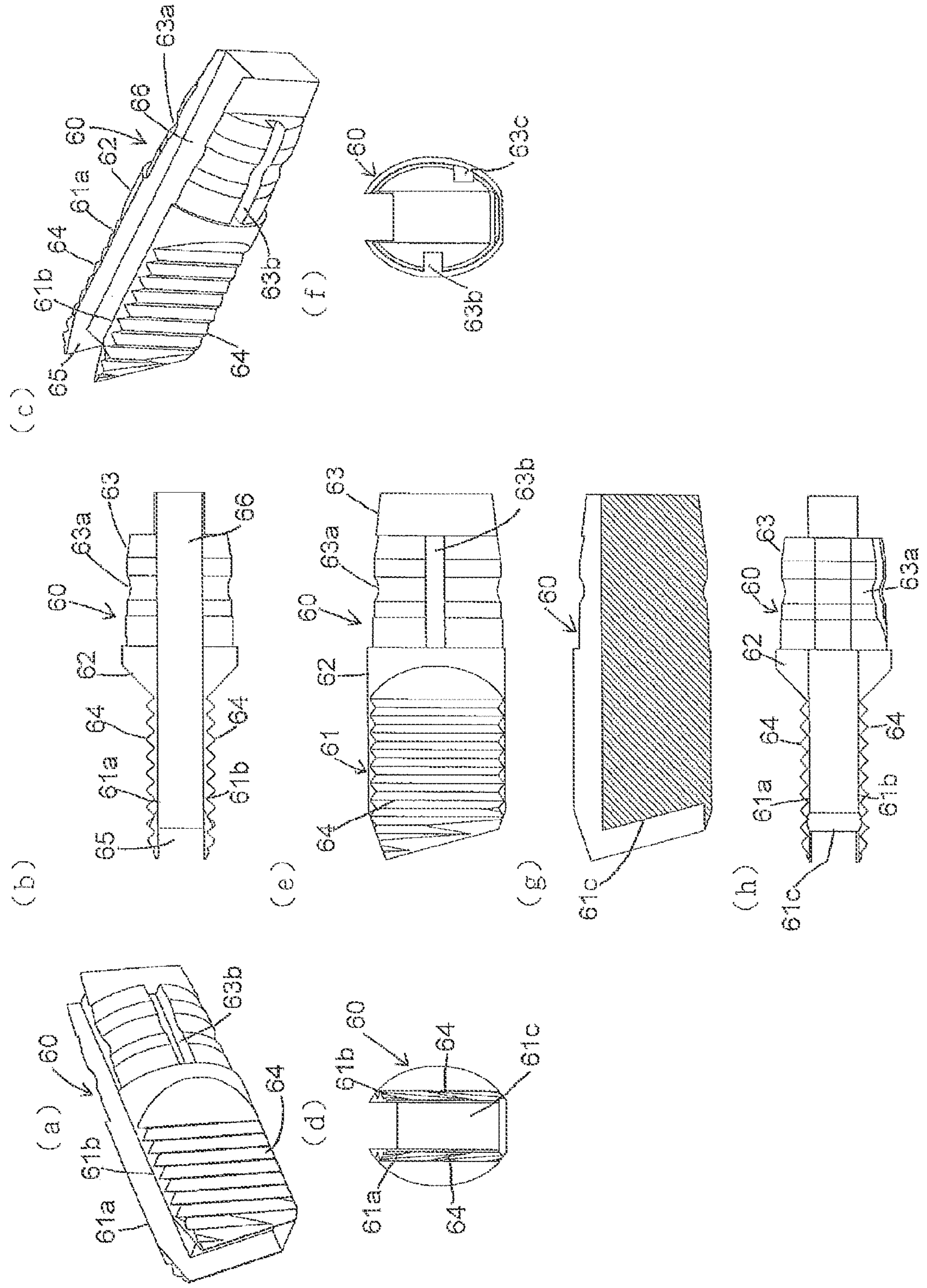
FIG. 11 Drawings showing one embodiment of a holder for holding the ink feed core and writing part of the pen tip of FIG. 10, (*a*) a perspective view seen from the front side, (*b*) a plan view, (*c*) a perspective view seen from the rear side, (*d*) a right side view, (*e*) a front view, (*f*) a left side view, (*g*) a longitudinal section viewed from the front, and (*h*) a bottom view.

FIGS. 6 to 11 are drawings showing examples of an embodiment of a pen tip to which the fiber-bundled part for writing instruments of the present disclosure obtained above is applied, as well as an embodiment of a writing instrument to which the pen tip is applied. FIGS. 6 and 7 show a twin-type writing instrument having pen tips at both ends, one having a writing pen core and the other having an ink feed core, depicting a state with its caps on and another state with its caps off, respectively. FIGS. 8 and 9 include an enlarged drawing of the pen tip having a writing pen core, and drawings of a holder for holding the writing pen core. FIGS. 10 and 11 include an enlarged drawing of the pen tip having an ink feed core, and drawings of a holder for holding the ink feed core.

As shown in FIGS. 6 and 7, a writing instrument X of this embodiment includes a barrel member 10 serving as a writing instrument main body, ink retainers 20 and 21 housed in the barrel member 10 to store ink, pen tips 30 and 50 arranged via front barrels 15 and 16 that are fixed at both ends of the barrel member 10, respectively, and removable caps 70 and 71 covering the pen tips 30 and 50, respectively.

The barrel member 10 serving as the main body of the writing instrument is formed in a cylindrical shape and is made of thermoplastic resin, thermosetting resin or the like such as polyacetal-based resin, polyethylene-based resin, acrylic-based resin, polyester-based resin, polyamide-based resin, polyurethane-based resin, polyolefin-based resin, polyvinyl-based resin, polycarbonate-based resin, polyether-based resin, polyphenylene-based resin, etc., (hereinbelow, the resins are simply referred to as "each resin"). The barrel member has openings at both ends to which front barrels 15 and 16 for holding pen tips 30 and 50 are attached, respectively. Housed in the barrel member 10 are ink retainers 20 and 21 for storing ink. The ink retainers 20 and 21 are separated by a central partition 23 and configured to supply ink held therein to respective pen tips 30 and 50.

The ink retainers 20 and 21 are impregnated with an ink composition for writing instruments such as water-based ink, oil-based ink, and thermochromic ink, and their examples include a fiber bundle formed of one or a combination of two or more substances, selected from natural fibers, animal hair fibers, polyacetal-based resin, acrylic-based resin, polyester-based resin, polyamide-based resin, polyurethane-based resin, polyolefin-based resin, polyvinyl-based resin, polycarbonate-based resin, polyether-based resin, polyphenylene-based resin, etc., a processed material of fiber bundles of felt etc., and porous materials such as sponges, resin particles, and sintered bodies.

The composition of the ink for writing instruments to be occluded in the ink retainers 20 and 21 is not particularly limited, and may be suitably formulated as a compound of a water-based ink, an oil-based ink, or a thermochromic ink, depending on the application of the writing instrument (felt-tip pen, marking pen, felt pen). For example, for underliner pens and the like, fluorescent dyes such as Basic Violet 11, Basic Yellow 40 can be used as ink, or thermochromic microcapsule pigments and the like can be formulated as content.

The ink retainers 20 and 21 of this embodiment occlude the same ink composition therein. The ink retainers 20 and 21 may occlude different ink compositions from each other.

As shown in FIGS. 6 to 8, the pen tip 30 has a writing pen core 31 and a holder 40 for mounting the writing pen core 31. The writing pen core 31 is formed of a fiber-bundled part for writing instruments described above. The writing pen core 31 of this embodiment is 1.0 mm thick×2.0 mm wide×16 mm long. The front part of the writing pen core 31 serves as a writing part 32 while the rear end is inserted into the front-end side of the ink retainer 20 so that ink occluded in the ink retainer 20 is supplied to the writing part 32 in the front part of the writing pen core 31.

As shown in FIGS. 6 to 9, the holder 40 fixes the writing pen core 31 serving as a writing core by fitting, and is fixed to the front-end opening of the front barrel 15 of the barrel member 10, and includes a bulging attachment body 41, and a flange 42 and a see-through window frame portion 43 having a trapezoidal section, on the front side of the attachment body 41. Formed inside the attachment body 41 and on the front-end side of the window frame portion 43 are mounting holes 44 and 45 for receiving the writing pend core 31 so as to catch and hold the writing pen core 31.

The holder 40 comprised of the above elements has a concave fitting portion 46*a* formed in the width direction on the peripheral surface of the attachment body portion 41 and liner air circulation grooves 46*b* and 46*c* formed on both sides in the longitudinal direction on the peripheral surface thereof. The thus configured holder 40 is formed of, for example, a synthetic resin, metal, glass and the like.

As shown in FIGS. 6, 7 and 10, the pen tip 50 has an ink feed core 51, a writing part 52 made of a porous material on the front-end side of the ink feed core 51 and a holder 60 to which the ink feed core 51 and the writing part 52 are attached. The ink feed core 51 is composed of the above-described fiber-bundled part for writing instruments. The ink feed core 51 of the present embodiment efficiently feeds (supplies) the ink stored in the ink retainer 21 to the writing section 52, and is 0.8 mm thick×1.6 mm wide×16 mm long.

As shown in FIGS. 6, 7, 10 and 11, the holder 60 is composed of a plate-shaped holding part 61, a flange part 62 integrally formed at the rear end of the plate-shaped holding part 61 so as to protrude radially outward, and a bulging attachment body 63 integrally formed in the rear of the flange part 62.

The plate-shaped holding part 61 is composed of two plate surfaces 61*a* and 61*b* and a thick-plate surface portion 61*c* that is formed in the plate thickness direction and is surrounded by the front faces of the place surfaces 61*a* and 61*b* and one side face of each of plate surfaces 61*a* and 61*b*. The writing part 52 made of a writing core is held on the thick-plate surface portion 61*c* of the plate-shaped holding part 61. The plate surfaces 61*a* and 61*b* are arranged on both sides so as to sandwich the thick-plate surface portion 61*c*. Each of the plate surfaces 61*a* and 61*b* is formed by a plane substantially perpendicular to the thick-plate portion 61*c* (that is, the plane substantially orthogonal to the plate thickness direction). In addition, triangular jagged faces 64, 64 are formed on both outer surfaces of the plate surfaces 61*a*, 61*b*, so that the plate-shaped holding part 61 is given appropriate flexibility in the plate thickness direction.

A holding groove 65 in which the writing part 52 is held is formed in the thick-plate surface portion 61*c*. Further, a holding groove 66 is defined by the upper parts of the plate surfaces 61*a* and 61*b* so that the ink feed core 51 is fitted in the holding groove 66.

A concave fitting portion 63*a* is formed in the width direction on the outer peripheral surface of the attachment body part 63 of the thus configured holder 60 while linier air circulation grooves 63*b* and 63*c* are formed on both side of the outer peripheral surfaces and extended in the longitudinal direction on the outer peripheral surface.

The holder 60 thus configured can be, as whole, formed of a relatively hard synthetic resin such as polypropylene, polyethylene, polystyrene, polycarbonate, polyethylene terephthalate, polyacetal, acrylic, nylon, acrylonitrile-styrene copolymer resin (AS resin), acrylonitrile-butadiene-styrene copolymer resin (ABS resin) and others. On the other hand, the material for the holder 43 may use a synthetic resin having elasticity. Examples of the synthetic resin having elasticity include soft polyethylene, soft polypropylene, nylon, rubber elastic materials (e.g., thermoplastic elastomers such as styrene-based elastomers, olefin-based elastomers, polyester-based elastomers). The synthetic resin forming the holder 60 may be a resin having transparency, whereby the contact state between the writing part 52 consisting of the writing core and the paper surface can be visually recognized during writing.

In the pen tip 30 of the above embodiment, the writing pen core 31 is composed of a fiber-bundled part for writing instruments having the above configuration with a rectangular cross-section, being 1.0 mm thick×2.0 mm wide×16 mm long. Even if the thickness of the pen tip is thus thin, the fiber-bundled part can offer a writing pen core that is excellent in strength and durability against the writing loads and is free from variation in yarn density with respect to the longitudinal direction of the core without losing ink supply performance and other properties as a fiber-bundled part.

The pen tip 50 of the present embodiment has the ink feed core 51 that feeds ink to the writing part. The ink feed core 51 is composed of a fiber-bundled part for writing instruments having the above configuration, and is excellent in strength and durability and is free from variation in yarn density with respect to the longitudinal direction of the core without losing ink supply performance and other properties as a fiber-bundled part when it is given in a sheet-like form.

Further, since, in the pen tip 50 of the present embodiment, the plate-shaped holding part 61 is formed with jagged faces 64, 64 having a depth in the plate-thickness direction, the plate-shaped holding part 61 can produce suitable flexibility in the plate thickness direction. Further, since the plate-shaped holding part 61 is made of elastic synthetic resin, the plate-shaped holding part 61 can reliably obtain flexibility in the plate thickness direction.

According to the writing instrument of the present disclosure having the pen tip 30 and the pen tip 50 at both ends as described above, the fiber-bundled part will not lose ink supply performance or writing performance and is free from variation in yarn density with respect to the longitudinal direction of the core while the writing pen core or the ink feed core is excellent in strength and durability.

The writing instrument of the present disclosure is not limited to the above-described embodiment and the like, and can be variously modified without departing from the scope of the technical idea of the present disclosure.

Though in the description of the writing instrument of the above embodiment, the writing instrument of a twin-type writing instrument having the pen tip 30 with the writing pen core 31 and the pen tip with the ink feed core 51 for feeding ink to the writing portion 52, at both ends of the barrel member 10, was detailed, each of the pen tip 30 with the writing pen core 31 and the pen tip 50 with the ink feed core 51 for feeding ink to the writing portion 52 may be individually used to provide a single-type writing instrument.

Though each of the above-described embodiments was described with inks for writing implements (water-based ink, oil-based ink, thermochromic ink), liquid materials such as liquid cosmetics, liquid medicines, coating liquids, and correction liquids may be used.

EXAMPLES

Next, the present disclosure will be described in more detail with reference to examples and comparative examples, but the present disclosure is not limited to the following examples and the like.

Example 1

A fiber-bundled part for writing instruments was obtained by the method shown below using fibers made of the following thermoplastic resins.

(Multifilament of Long Fibers Having Fibers with Different Melting Points: Core-Sheath Type Composite Fiber)

Core-Sheath Type Composite Fiber: composite fiber (5 denier of thickness) consisting of polyethylene terephthalate copolymer having a low melting point (melting point: 160° C.) as the sheath and polyethylene terephthalate having a high melting point (melting point: 250° C.) as the core.

(Crimped Fiber)

The core-sheath type composite fiber was false twisted to be crimped.

The crimp ratios of the crimped fibers were calculated to be 5% and 15%. Also, the content ratio of the crimped fibers to the total amount of the fiber-bundled part was 100% by mass, for both of the two types.

(Manufacturing Method of Fiber-Bundled Part)

As shown in FIG. 4, a fiber-bundled part was formed by aligning and pulling the thermoplastic resin fibers in the longitudinal direction to solidify and bind them with the thermoforming machine 10. In this process, the temperature for solidifying and binding was 160° C., and the time for the fibers to pass through the die was 30 seconds. The obtained fiber bundle was, specifically a sheet-like fiber-bundled part having a thickness of 1.0 mm and a width of 2.0 mm. In this forming, the fiber with a crimp ratio of 5% was adjusted to have a fiber density of 5,000 d/mm$^2$ with a porosity of 50%. The other fiber with a crimp ratio of 15% was adjusted to have a fiber density of 3,000 d/mm$^2$ with a porosity of 65%.

Figure 5:
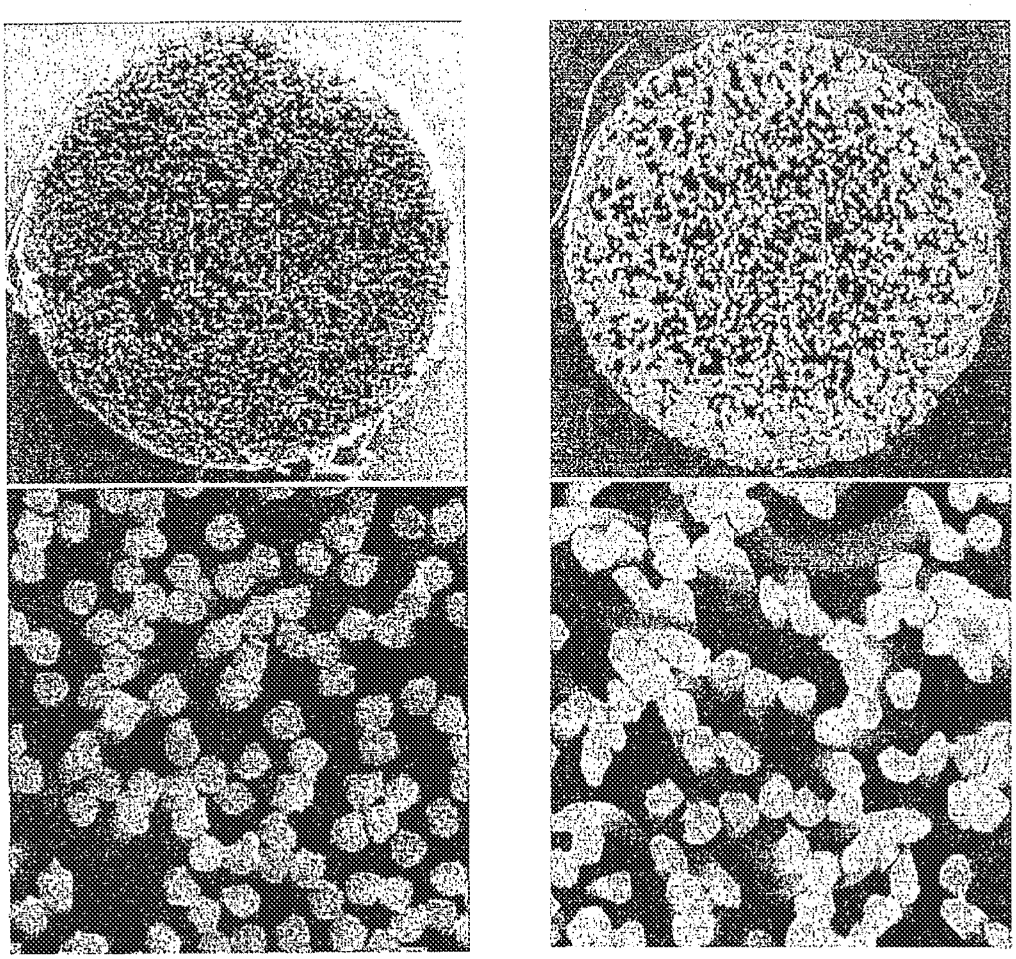
FIG. 5 (*a*) An endface view showing one example (embodiment) of a fiber-bundled part for writing instruments of the present disclosure with an electron microscope (SEM) photograph of an enlarged view of the same, and (*b*) an endface view showing a comparative example of a fiber-bundled part for writing instruments beyond the scope of the present disclosure with an electron microscope (SEM) photograph of an enlarged view of the same.

When this fiber-bundled part was observed with an electron microscope (SEM), it was confirmed that a homogeneous cross-sectional structure was formed as shown in FIG. 5(*a*) without substantially differential density distributions between the central part of the core and the outer skin part.

This fiber-bundled part was cut into a piece of 16 mm long to form the writing pen core 31 of the pen tip 30, shown in FIG. 6.

Example 2

A fiber-bundled part for writing instruments was obtained by the method shown below using fibers made of the following thermoplastic resins.

(Multifilament of Long Fibers Having Fibers with Different Melting Points: Core-Sheath Type Composite Fiber)

Core-Sheath Type Composite Fiber: composite fiber (5 denier of thickness) consisting of polyethylene terephthalate copolymer having a low melting point (melting point: 160° C.) as the sheath and polyethylene terephthalate having a high melting point (melting point: 250° C.) as the core.

(Crimped Fiber)

The core-sheath type composite fiber was false twisted to be crimped.

The crimp ratio of the crimped fiber was calculated to be 5%. Also, the content ratio of the crimped fiber to the total amount of the fiber-bundled part was 100% by mass.

(Manufacturing Method of Fiber-Bundled Part)

As shown in FIG. 4, a fiber-bundled part was formed by aligning and pulling the thermoplastic resin fibers in the longitudinal direction to solidify and bind them with the thermoforming machine 10. In this process, the temperature for solidifying and binding was 160° C., and the time for the fibers to pass through the die was 30 seconds. The obtained fiber bundle was specifically a sheet-like fiber-bundled part having a thickness of 0.8 mm and a width of 1.6 mm with a fiber density of 4,000 d/mm$^2$ and a porosity of 60%.

When this fiber-bundled part was observed with an electron microscope (SEM), it was confirmed that a homogeneous cross-sectional structure was formed without substantially differential density distributions between the central part of the core and the outer part, similarly to that as shown in FIG. 5(*a*).

This fiber-bundled part was cut into a piece of 16 mm long to form the ink feed core 51 of the pen tip 50, shown in FIG. 6.

Example 3

A fiber-bundled part for writing instruments was obtained by the method shown below using fibers made of the following thermoplastic resins.

(Multifilament of Long Fibers Having Fibers with Different Melting Points: Side-by-Side Composite Fiber)

Side-by-side composite fiber: Composite fiber (5 denier of thickness) with a mass ratio of 1:1 for 66 nylon (melting point: 265° C.) on one side and 6 nylon (melting point: 225° C.) on the other side.

(Crimped Fiber)

The above side-by-side composite fiber was crimped by push-in-type (gear type) crimping.

The crimp ratio of the crimped fiber was calculated to be 8%. The content ratio of the crimped fiber to the total amount of the fiber-bundled part was 100% by mass.

(Manufacturing Method of Fiber-Bundled Part)

As shown in FIG. 4, a fiber-bundled part was formed by aligning and pulling the thermoplastic resin fibers in the longitudinal direction to solidify and bind them with the thermoforming machine 10. In this process, the temperature for solidifying and binding was 225° C., and the time for the fibers to pass through the die was 30 seconds. The obtained fiber bundle was specifically a sheet-like fiber-bundled part having a thickness of 1.0 mm and a width of 2.0 mm with a fiber density of 5,000 d/mm$^2$ and a porosity of 50%.

When this fiber-bundled part was observed with an electron microscope (SEM), it was confirmed that a homogeneous cross-sectional structure was formed as shown in FIG. 5(*a*) without substantially differential density distributions between the central part of the core and the outer skin part.

This fiber-bundled part was cut into a piece of 16 mm long to form the ink feed core 31 of the pen tip 30, shown in FIG. 6.

Comparative Example 1

Instead of using core-sheath type multifilament crimped fibers with different melting points in Example 1 above, a conventional single-component polyester multifilament was molded as crimped fibers, then impregnated with a polyurethane binder resin, and the binder was solidified in a heating furnace in the same manner as in Example 1.

The obtained fiber-bundled part was, specifically, a sheet-like fiber-bundled part having a thickness of 1.0 mm and a width of 2.0 mm with a fiber density of 5,000 d/mm$^2$. The crimp ratio of the crimped fibers was 13%. Also, the content ratio of the crimped fibers to the total amount of the fiber-bundled part was 100% by mass. The porosity of the fiber-bundled port was 50%.

This fiber-bundled part was observed with an electron microscope (SEM). Due to the influence of evaporation of the solvent, the polyurethane binder resin concentrated onto the outer skin part of the core, so that the product presented an inhomogeneous cross-sectional structure with a large difference in the density distribution between the central part of the core and the outer skin part, as shown in FIG. 5(*b*).

This fiber-bundled body was cut into a piece of 16 mm long to form the writing pen core 31 of the pen tip 30 shown in FIG. 6.

The fiber-bundled parts obtained in Examples 1 to 3 and Comparative Example 1 were assembled into the pen body shown in FIG. 6, and the writing performance of each was evaluated. As a result, it was confirmed that the fiber-bundled parts of the examples were superior in the following points to that using the conventional binder in Comparative Example 1:

(1) Without use of a binder, sufficient strength and durability for writing were obtained by adjusting the loading amount (basis weight volume) of fibers, heating temperature, and heating time.

(2) Since the pen core was free from binder imbalance, hence had no unevenness in hardness, there was no uncomfortable sensation during writing, attributed to the writing direction.

(3) The ink holding capacity was improved by 10% or more.

(4) Ink fluidity and diffusibility became uniform.

(Examples of Pen Tip and Writing Instrument)

The fiber-bundled parts obtained in Examples 1 and 2 above were used for the writing pen core 31 and the ink feed core 51 to produce a writing instrument conforming to FIGS. 6 to 11. The dimensions of the writing instrument, the writing pen core 31, the ink feed core 51 and others were specified as above. In addition, an ink for writing instruments having the following composition was used.

(Writing Instrument Configuration)

Barrel member 10: made of polypropylene, 100 mm long with an inner diameter of 8 mm in the middle portion; an outside diameter of 10 mm Ink retainers 20, 21: made of PET fiber, a porosity of 85%, dimensions of ø6×45 mm Holder 40: made of acrylic resin, a transparent window frame of 5×4×11.5 mm Writing part 52: a polyethylene sintered core, a porosity of dimensions of 4×3×6 mm Holder 60: made of acrylic resin, a transparent window frame of 5×2.5×12 mm (Ink Composition for Writing Instruments, Ink Color: Black)

An ink of the following composition (100° by mass in total) was used as the ink for writing instruments.

Activator: Megafac F410 (fluorine-based anionic surfactant, perfluoroalkyl group-containing carboxylate, manufactured by DIC Corporation) 1% by mass Antifungal agent: benzisothiazolin-3-one 0.2% by mass Glyceryl glucoside aqueous solution: αGG (high-concentration α-glyceryl glucoside aqueous solution, α-glyceryl glucoside 60% aqueous solution, manufactured by JTS Co., Ltd.) 3% by mass Pigment aqueous dispersion: FUJI SP BLACK 8041 (black pigment aqueous dispersion, solid content 20%, manufactured by Fuji Pigment Co., Ltd.) 20% by mass Water-soluble organic solvent: glycerin 5% by mass Water-soluble organic solvent: ethylene glycol 5% by mass Water (solvent): ion-exchanged water 65.8% by mass Viscosity (25° C.): 3.6 mPa·s (Cone-plate type viscometer TV-20, manufactured by TOKIMEC Co., Ltd.)

Surface tension (25° C.): 40 mN/m (automatic surface tens ion meter DY-300 manufactured by Kyowa Interface Science Co., Ltd.)

It was confirmed that a writing instrument X equipped with the pen tips 30 and 50, respectively using the writing pen core 31 and the ink feed core 51, which both were formed of the fiber-bundled parts obtained in Examples 1 and 2 above could offer excellent strength and durability and be free from variation in yarn density with respect to the longitudinal direction of the core without losing ink supply performance and the like of the ink for writing instruments.

INDUSTRIAL APPLICABILITY

Fiber-bundled parts for writing instruments that are suitably used for ink feed cores and writing pen cores as pen tips of writing instruments, as well as the pen tips and writing instruments using the fiber-bundled part, can be obtained.

DESCRIPTION OF SYMBOLS

X writing instrument
A fiber-bundled part for writing instruments
B fiber-bundled part for writing instruments
30 pen tip
31 writing pen core
50 pen tip
51 ink feed core

The invention claimed is:

1. A fiber-bundled part for writing instruments used for an ink feed core leading to a pen tip or a writing pen core, comprising:

a multifilament of long fibers having different melting points, the multifilament at least containing crimped fibers, wherein a crimp ratio of the crimped fibers that is determined by a following formula (I) falls within a range from 1 to 50%, $$\text{the crimp ratio}=(\text{a crimp width}/\text{a crimp length})\times 100 \qquad (I)$$

wherein in the formula (I), a distance between a wave crest to a next wave crest in the fiber is defined as a crimp length, and a distance between the wave crest and a trough of a wave in a direction perpendicular to the crimp length is defined as a crimp width.

2. The fiber-bundled part for writing instruments according to claim 1, wherein a content ratio of the crimped fibers to a total amount of the fiber-bundled part for writing instruments ranges from 10 to 100% by mass.

3. The fiber-bundled part for writing instruments according to claim 2, wherein the fiber-bundled part has a rectangular cross-section.

4. A pen tip having a writing pen core, wherein the writing pen core is formed of the fiber-bundled part for the writing instruments according to claim 1.

5. A pen tip having the ink feed core that feeds ink to a writing part, wherein the ink feed core is formed of the fiber-bundled part for the writing instruments according to claim 1.

6. A writing instrument comprising the pen tip according to claim 4.

7. A writing instrument comprising the pen tip according to claim 5.

* * * * *